(12) United States Patent
Bouldin et al.

(10) Patent No.: US 8,141,818 B2
(45) Date of Patent: Mar. 27, 2012

(54) RAM DOOR ASSEMBLIES

(75) Inventors: Bruce Dan Bouldin, Phoenix, AZ (US); Adam Kowal, Milwaukee, WI (US); Vincent Doras, Mesa, AZ (US); Robert Robbins, Chandler, AZ (US); Jim Lyells, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 440 days.

(21) Appl. No.: 12/497,036

(22) Filed: Jul. 2, 2009

(65) Prior Publication Data
US 2011/0001019 A1 Jan. 6, 2011

(51) Int. Cl.
*B64D 33/02* (2006.01)
(52) U.S. Cl. .................................... 244/53 B
(58) Field of Classification Search ............... 244/53 R, 244/53 B, 58, 110 B; 60/270.1, 226.1, 226.2, 60/767, 768; 137/15.1, 15.2
See application file for complete search history.

(56) References Cited

U.S. PATENT DOCUMENTS

| 4,174,083 | A | 11/1979 | Mohn |
| 4,844,382 | A | 7/1989 | Raisbeck |
| 5,655,359 | A | 8/1997 | Campbell et al. |
| 5,876,088 | A | 3/1999 | Spears |
| 6,050,527 | A | 4/2000 | Hebert et al. |
| 6,082,669 | A | 7/2000 | Bardagi et al. |
| 6,264,137 | B1 | 7/2001 | Sheoran |
| 6,293,494 | B1 | 9/2001 | Scherer et al. |
| 6,390,414 | B1 | 5/2002 | Medvedev |
| 6,895,742 | B2 | 5/2005 | Lair et al. |
| 7,222,819 | B1 | 5/2007 | Kelnhofer |
| 7,344,107 | B2 | 3/2008 | Campbell et al. |

*Primary Examiner* — Tien Dinh
*Assistant Examiner* — Nicholas McFall
(74) *Attorney, Agent, or Firm* — Ingrassia Fisher & Lorenz, P.C.

(57) ABSTRACT

A ram door assembly is provided for an intake opening of an intake duct of an auxiliary power unit of an aircraft. The ram door assembly includes a ram door hingeably mounted adjacent to the intake opening and moveable between an open position to a closed position. The ram door has an interior surface and an exterior surface. The ram door assembly further includes a fairing positioned on the interior surface of the ram door.

16 Claims, 5 Drawing Sheets

| DOOR CONFIG. | FLAP ANGLE (DEG) | MN | ALT (FT) | APU RECOVERY | COOLING DUCT RECOVERY | DRAG CD | DRAG FORCE (N) | MOMENT ABOUT DOOR HINGE (N-m) |
|---|---|---|---|---|---|---|---|---|
| DOOR W/ FAIRING | 45 | 0 | 0 | 0.991 | 0.993 | -- | -- | -- |
| DOOR NO FAIRING | 45 | 0 | 0 | 0.990 | 0.993 | -- | -- | -- |
| DOOR W/ FAIRING | 20 | 0.3 | 10000 | 0.958 | 0.959 | 0.000123 | 234 | 164 |
| DOOR NO FAIRING | 20 | 0.3 | 10000 | 0.956 | 0.957 | 0.000145 | 275 | 184 |
| DOOR W/ FAIRING | 45 | 0.3 | 10000 | 0.960 | 0.961 | 0.000431 | 817 | 330 |
| DOOR NO FAIRING | 45 | 0.3 | 10000 | 0.958 | 0.960 | 0.000467 | 886 | 349 |
| DOOR W/ FAIRING | 20 | 0.55 | 0 | 0.872 | 0.869 | 0.000177 | 1644 | 1119 |
| DOOR NO FAIRING | 20 | 0.55 | 0 | 0.871 | 0.865 | 0.000194 | 1801 | 1218 |
| DOOR W/ FAIRING | 20 | 0.85 | 35000 | 0.731 | 0.747 | 0.000205 | 1072 | 722 |
| DOOR NO FAIRING | 20 | 0.85 | 35000 | 0.729 | 0.737 | 0.000224 | 1169 | 787 |

FIG. 5

RAM DOOR ASSEMBLIES

TECHNICAL FIELD

The present invention generally relates to ram door assemblies, and more particularly relates to ram door assemblies for auxiliary power units of aircraft.

BACKGROUND

Aircraft often have an on-board auxiliary power unit to provide electrical power and compressed air to various systems. When the aircraft is on the ground, the auxiliary power unit is the primary source of power to drive the environmental control systems, air driven hydraulic pumps, and the starters for the engines. During flight, auxiliary power units may provide pneumatic and electric power.

The auxiliary power unit is typically arranged in the tailcone of an aircraft. An intake duct extends between an intake opening in the exterior surface of the tailcone and the auxiliary power unit itself. The intake duct defines an airflow passage through which air for the auxiliary power unit is drawn. A ram door assembly at the intake opening selectively opens and closes depending on auxiliary power unit and/or aircraft requirements. The air flowing through the intake duct may be used to run the auxiliary power unit, cool the auxiliary power unit oil, and/or ventilate the auxiliary power unit compartment.

It has been found that conventional ram door assemblies may have certain disadvantages. For example, turbulence, vortices, or other distortions may form as air enters the intake opening. This reduction in efficiency in the intake airflow may impact the performance of the auxiliary power unit. Attempts to address these disadvantages may adversely impact the size and weight of the auxiliary power unit and/or the ram door assemblies. Other adjustments to the ram door assemblies may result in an increase in the overall aerodynamic resistance, e.g. the total coefficient of drag, of the aircraft.

Accordingly, it is desirable to provide improved ram door assemblies that increase the efficiency of intake airflow. In addition, it is desirable to provide such ram door assemblies while improving aerodynamic drag characteristics. Furthermore, other desirable features and characteristics of the present invention will become apparent from the subsequent detailed description of the invention and the appended claims, taken in conjunction with the accompanying drawings and this background of the invention.

BRIEF SUMMARY

In one exemplary embodiment, a ram door assembly is provided for an intake opening of an intake duct of an auxiliary power unit of an aircraft. The ram door assembly includes a ram door hingeably mounted adjacent to the intake opening and moveable between an open position to a closed position. The ram door has an interior surface and an exterior surface. The ram door assembly further includes a fairing positioned on the interior surface of the ram door.

In another exemplary embodiment, an assembly for an aircraft includes an auxiliary power unit and an intake duct configured to deliver an airflow to the auxiliary power unit. The intake duct has a first end coupled to the auxiliary power unit and a second end defining an intake opening. The assembly further includes a ram door assembly comprising a ram door hingeably mounted adjacent to the intake opening and moveable between an open position to a closed position. The ram door has an interior surface and an exterior surface. The assembly further includes a fairing positioned on the interior surface of the ram door.

BRIEF DESCRIPTION OF THE DRAWINGS

The present invention will hereinafter be described in conjunction with the following drawing figures, wherein like numerals denote like elements, and wherein:

FIG. 5 is a table indicating the improved recovery and drag associated with a ram door assembly in accordance with an exemplary embodiment.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments described herein provide a ram door assembly that selectively opens to enable airflow through an air duct to an engine, such as auxiliary power unit. The ram door assembly has a ram door with a fairing on the interior surface. The fairing of the ram door may direct air more efficiently into the intake duct and reduce drag.

Figure 1:
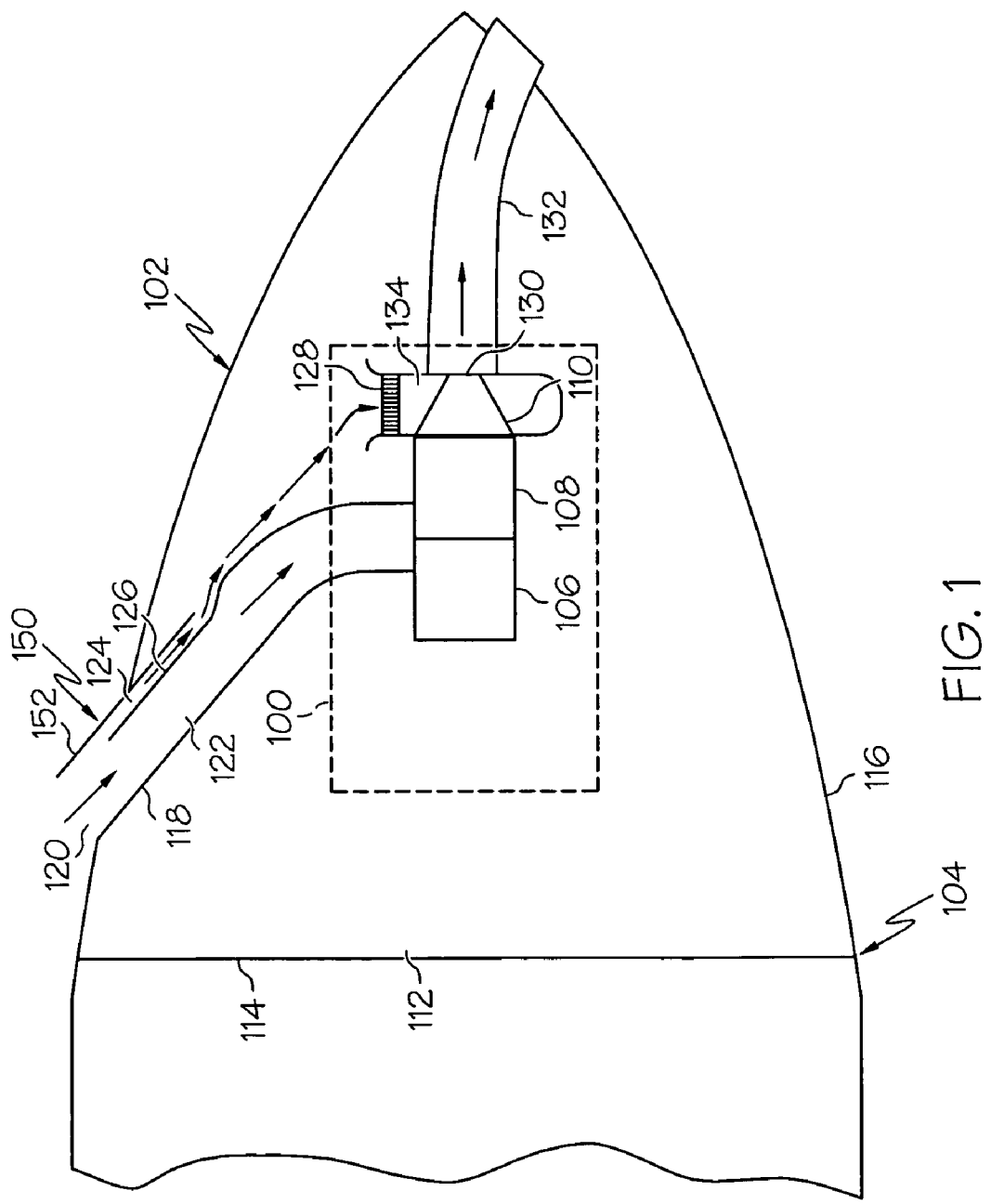
FIG. 1 is a cross-sectional schematic showing an auxiliary power unit and ram door assembly mounted in the tailcone of an aircraft in accordance with an exemplary embodiment.

FIG. 1 is a cross-sectional schematic showing an auxiliary power unit 100 and ram door assembly 150 mounted in the tailcone 102 of an aircraft 104 in accordance with an exemplary embodiment. The aircraft can be, for example, an airplane. The auxiliary power unit 100 includes a compressor 106, a combustor 108, and a turbine 110. The auxiliary power unit 100 is positioned in a compartment 112, which is located in the aft fuselage of the aircraft 104. The compartment 112 may be separated from the rest of the fuselage by a firewall 114, and exterior surfaces 116 of the airplane form the remaining walls of the compartment 112.

An intake duct 118 extends between an intake opening 120 in the exterior surface 116 and the auxiliary power unit 100. As described in more detail below, the ram door assembly 150 includes a ram door 152 pivotally attached to the aircraft 104 to open and close the intake opening 120. When the ram door 152 is open, as shown in FIG. 1, air will flow in the direction of the arrows under the influence of the auxiliary power unit itself (ground operation) or the airstream of the airplane and the auxiliary power unit (flight operation).

As noted above, the intake duct 118 defines a first airflow passage 122 through which the auxiliary power unit 100 draws its combustion air. The intake duct 118 further includes a divider 126 to define a second airflow passage 124 that extends to the oil cooler 128. As such, the first airflow passage 122 provides combustion air to the auxiliary power unit 100 and the second airflow passage 124 provides cooling air to the oil cooler 128.

An eductor 130 is positioned along the exhaust passage 132 from the turbine 110. A vacuum duct 134 is positioned between the eductor 130 and the oil cooler 128. The eductor 130 creates a low-pressure region in the vacuum duct 134 that assists the second airflow passage 124 in drawing air across the oil cooler 128. The cooling air is then mixed with the exhaust from the auxiliary power unit 100 and expelled into the ambient environment.

Figure 2:
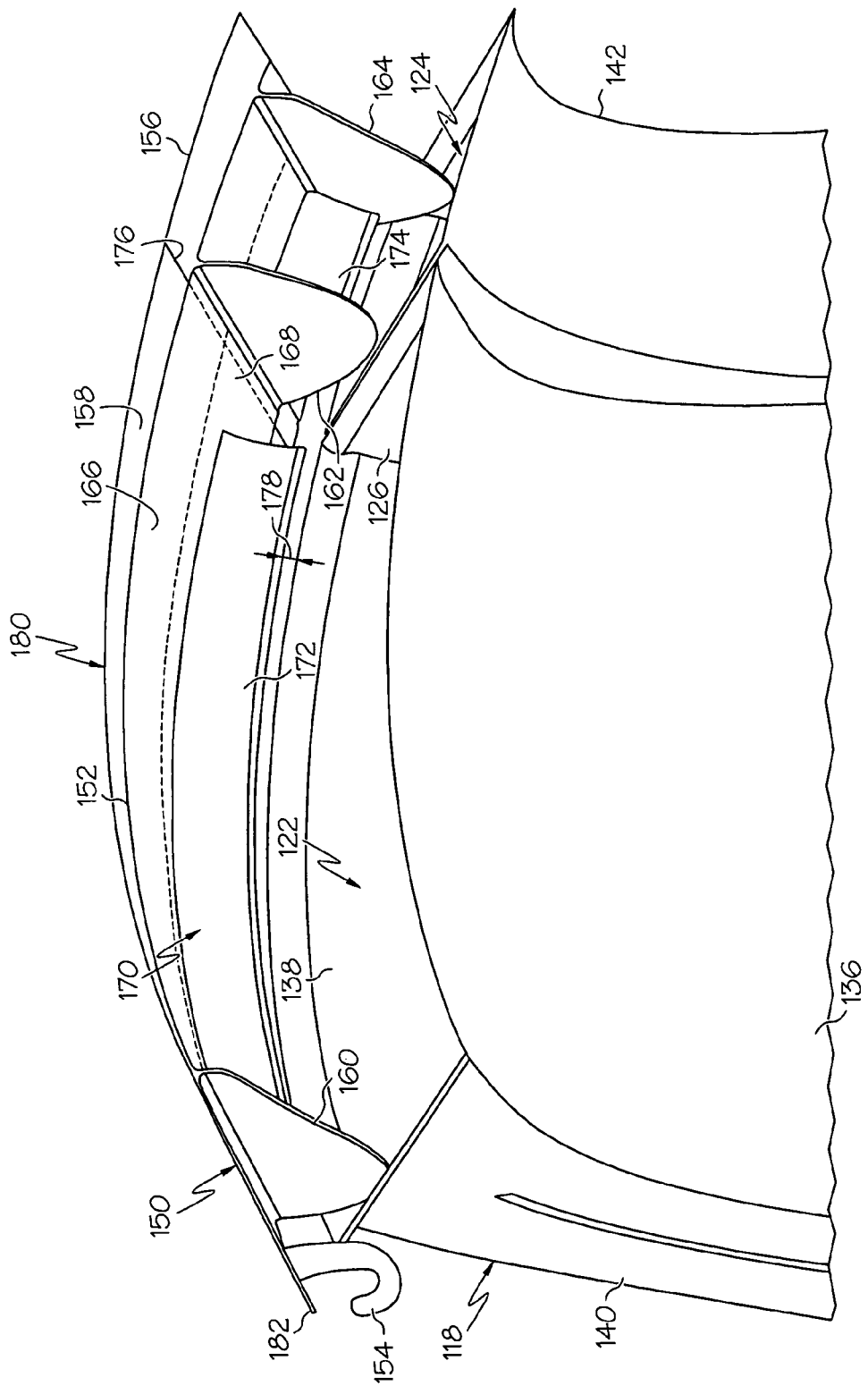
FIG. 2 is an isometric view of the ram door assembly in accordance with an exemplary embodiment.

FIG. 2 is a more detailed, perspective view of the ram door assembly 150 in accordance with an exemplary embodiment. In the view of FIG. 2, the ram door assembly 150 and a portion of the intake duct 118 have been removed from the aircraft for clarity. The intake duct 118 is generally rectangular in cross-section and defined by forward and aft walls 136, 138 and side walls 140, 142. As noted above, the divider 126 divides the intake duct 118 into the first airflow passage 122 and the second airflow passage 124.

The ram door assembly 150 includes a ram door 152 configured to open and close the intake duct 118. The ram door 152 is mounted on the aircraft at hinges 154 such that the ram door 152 opens in the direction of airflow. In FIG. 2, the ram door 152 is illustrated in the open position such that air flows into the first and second airflow passages 122, 124. In a closed position, a forward edge 180 and an aft edge 182 of the ram door 152 abut the outer surface of the aircraft to generally seal the intake duct 118. The ram door 152 has an exterior surface 156 that is exposed to the atmosphere in the closed position, and an opposing interior surface 158 that is exposed to the atmosphere in the open position. Generally, the ram door 152 is plate-like and is contoured to aerodynamically match the contour of the external tailcone walls in the closed position. In other embodiments, the ram door 152 and intake duct 118 may be shapes other than rectangular.

The ram door assembly may further include an actuating mechanism (not shown) with an actuator connected through a transmission arrangement or actuating linkage to the ram door 152 for moving the ram door 152 selectively into different positions. The transmission arrangement or linkage may be a mechanical transmission arrangement such as a rack and pinion arrangement, a threaded screw or spindle with a threaded follower nut, a rod linkage, a push-pull cable linkage (e.g. a Bowden cable), or the like. The ram door 152 may be opened to any suitable angle, including 20° and 45°.

First, second, and third side plates 160, 162, 164 extend from the interior surface 158 to help guide air into the first and second airflow passages 122, 124. Generally, the first and second side plates 160, 162 assist in directing air into the first air passage 122, and the second and third side plates 162, 164 assist in direct air into the second air passage 124. When the ram door 152 is in the closed position, the side plates 160, 162, 164 are tucked within the intake duct 118.

In one exemplary embodiment, the ram door assembly 150 further includes a fairing 170 extending from the interior surface 158 of the ram door 152. In general, the fairing 170 may be any structure that diverts airflow. In particular, the fairing 170 may reduce distortion in the airflow directed into the intake duct 118, particularly the first airflow passage 122 of the intake duct 118. As used herein, the term "distortion" refers generally to flow non-uniformity (e.g., pressure and/or velocity non-uniformity), and can be measured using any of a variety of techniques known to those of ordinary skill in the relevant art. In various embodiments, the fairing 170 may improve the efficiency of the airflow entering the intake duct 118, reduce pressures on the ram door 152, and reduce drag overall of the ram door assembly 150. The height of the fairing 170 may be used to adjust an air gap 178 between the fairing 170 and the exterior skin of the aircraft behind the ram door 152. The size of the air gap 178 may thus also affect the quality of the air entering the intake duct 118. These benefits may improve performance of the auxiliary power unit 100 (FIG. 1).

The fairing 170 functions to smoothly direct air into the intake duct 118 when the ram door 152 is open. The fairing 170 includes a first fairing portion 172 between the first and second side plates 160, 162 to direct airflow into the first airflow passage 122, and a second fairing portion 174 between the second and third side plates 162, 164 to direct airflow into the second airflow passages 124. In other embodiments, one or more of the side plates 160, 162, 164 may be omitted and the fairing 170 may be a single piece. In further other embodiments, the first fairing portion 172 or second fairing portion 174 may be omitted. In one exemplary embodiment, the fairing increases intake efficiency by reducing turning losses as the airflow traveling in the direction of the tailcone skin is directed down into the intake by the ram door.

The interior surface 158 of the ram door 152 can be considered to have an inner area 166 and an outer area 168. Generally, the inner area 166 extends about 50% of the length 176 from the aft edge 182 and the outer area 168 extends about 50% of the fairing length 176 from the forward edge 180. In one embodiment, the fairing 170 may be positioned in the inner area 166 of the interior surface 158, e.g., closer to the aft edge 182 than the forward edge 180.

Figure 3:
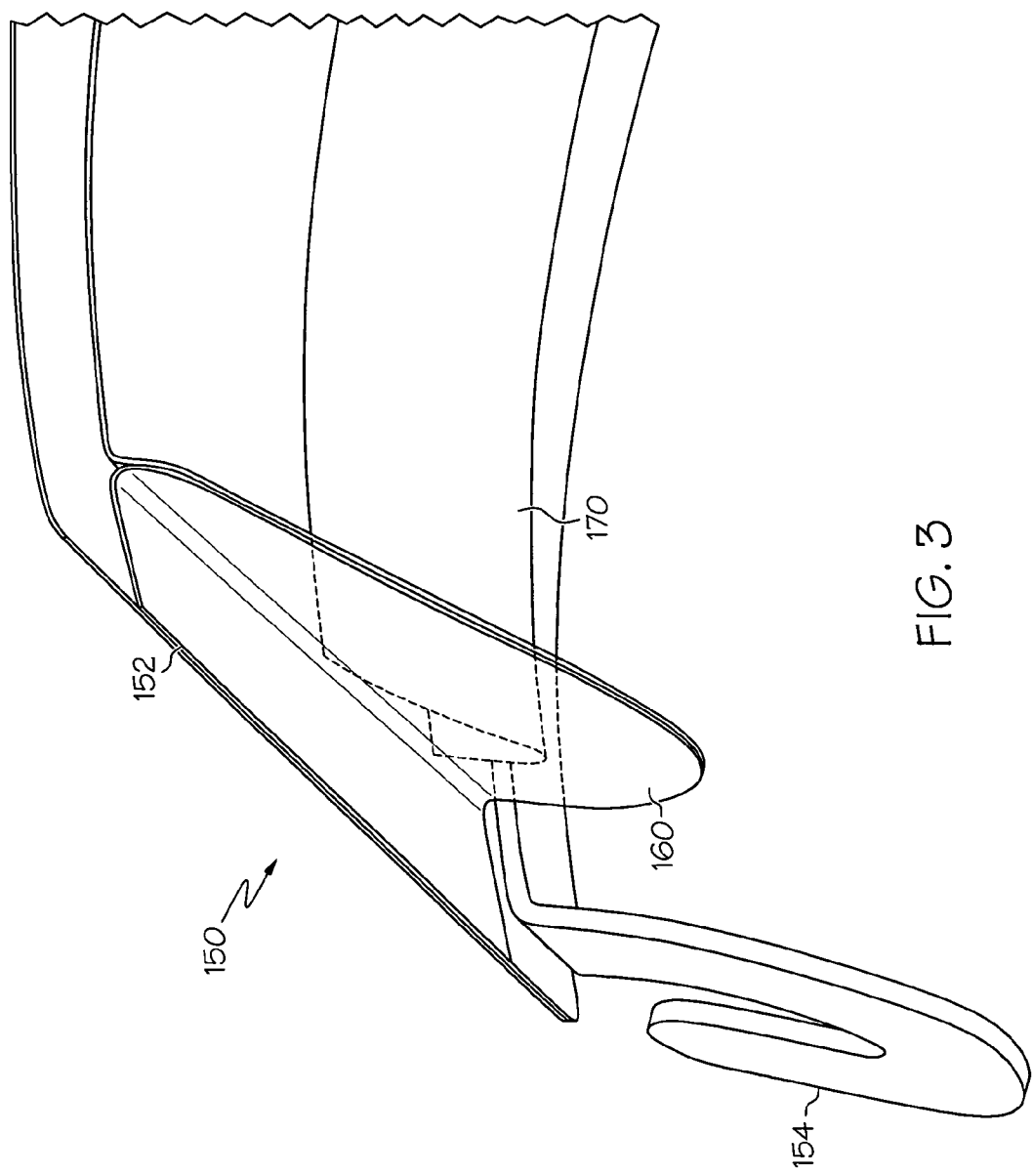
FIG. 3 is a closer, partial isometric view of the ram door assembly of FIG. 2.
Figure 4:
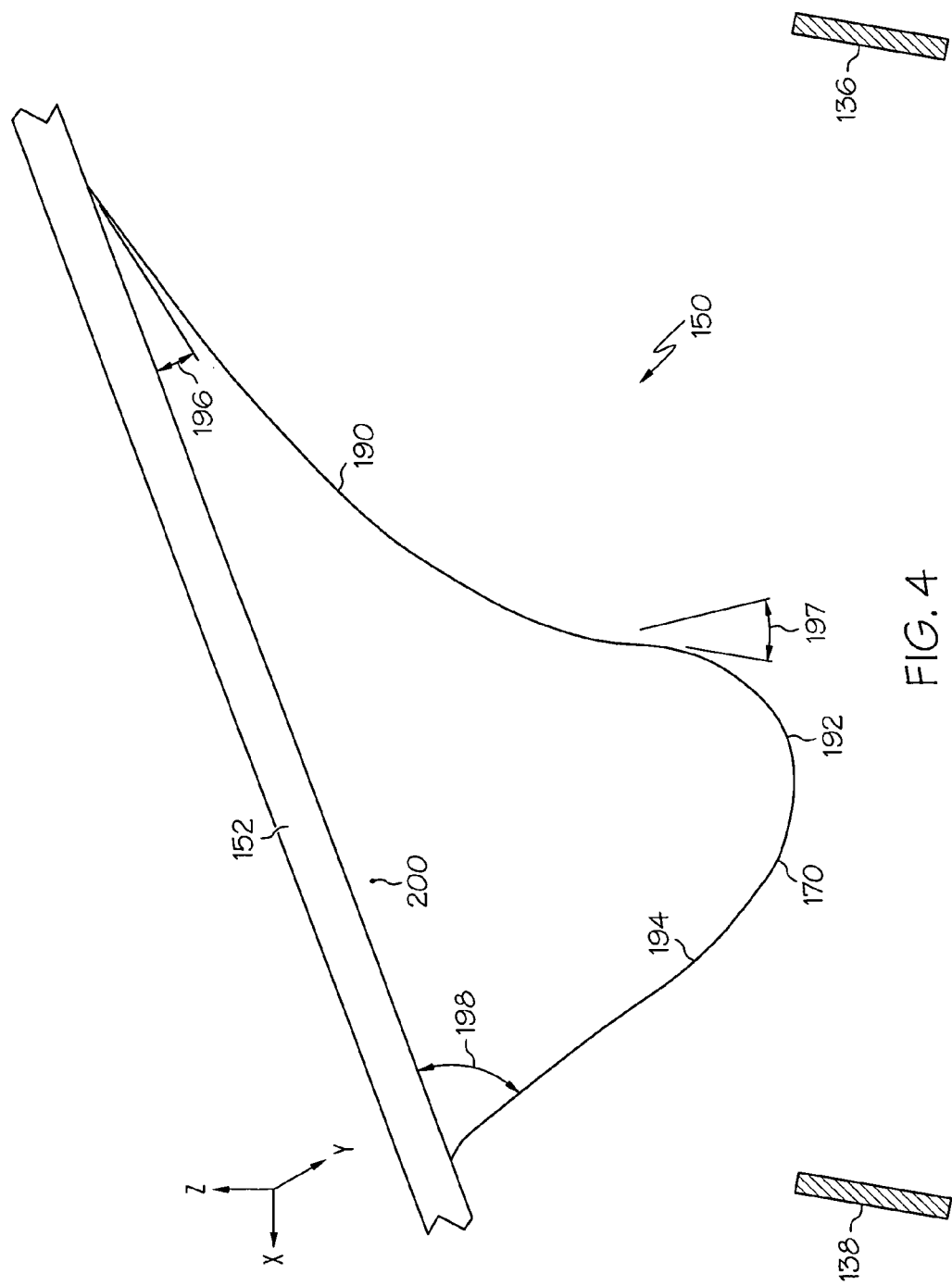
FIG. 4 is a cross-sectional view of the ram door assembly of FIG. 2.

FIG. 3 is a closer, partial isometric view of the ram door assembly 150 of FIG. 2 and FIG. 4 is a cross-sectional view of the ram door assembly 150 of FIG. 2. FIGS. 3 and 4 more clearly show the shape of the fairing 170. Overall, the fairing 170 may be smooth, continuous, arcuate, and convex.

Referring to FIG. 4, the fairing 170 may have a forward section 190 that extends up from the ram door 152, a generally arcuate transition section 192, and an aft section 194 that extends down to the ram door 152. The forward section 190 is generally more tapered than the aft section 194. In other words, the forward section 190 extends generally at a smaller, first angle 196 from the ram door 152 and the aft section 194 extends generally at a larger, second angle 198 to the ram door 152. The first angle 196 may be 10° or less relative to the ram door 152. The forward section 190 may at least partially be concave. A third angle 197 may generally enable the fairing 170 contour at this portion to be parallel to the angle of the aft wall of the intake duct 138. The arcuate transition section 192 may, in one embodiment, have a generous radius. The fairing 170 may be asymmetrical about a longitudinal axis 200, which is aligned with the z-axis in the view of FIG. 2. Particularly, the fairing 170 may be skewed towards the aft section 194. In alternative embodiments, the first, second, and third angles 196, 197, 198 may be modified, as necessary or desired.

FIG. 5 is a table indicating the improved recovery and drag characteristics associated with a ram door assembly, such as ram door assembly 150, in accordance with an exemplary embodiment. In general, FIG. 4 indicates various characteristics of ram door assemblies with fairings, such as ram door assembly 150, and corresponding ram door assemblies without fairings. More particularly, auxiliary power unit recovery, cooling duct recovery, drag force on the ram door, and the moment about the door hinge are shown for different opening angles, speeds and altitudes. As shown in FIG. 4, the ram door assembly with a fairing provides improved auxiliary power unit and cooling duct recovery, particularly at higher mach numbers. As examples of drag reduction, a 8.7% reduction in drag is achieved at a Mach number of 0.55, an altitude of 0 ft, and a flap angle of 20°, and a 14.9% reduction in drag is achieved at Mach number of 0.3, an altitude of 10,000 ft, and a flap angle of 20°.

In general, the auxiliary power unit performs better when it receives high recovery, low distortion flow via a ram door assembly 150 such as the exemplary embodiments disclosed herein. In other aspects, the size of the auxiliary power unit, and therefore the overall weight of the aircraft in which the auxiliary power unit is installed can be reduced because the auxiliary power unit is more efficient. This can reduce the operating costs of the aircraft in which the auxiliary power unit is installed. In one exemplary embodiment, the ability of the fairing to reduce ram door drag decreases the aircraft fuel burn. Although the ram door assembly 150 is described with respect to an auxiliary power unit of an aircraft, the ram door assembly 150 may be used with the air intake of other types of mechanical devices and systems.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A ram door assembly for an intake opening of an intake duct of an auxiliary power unit of an aircraft; comprising:
   a ram door hingeably mounted adjacent to the intake opening and moveable between an open position and a closed position, the ram door having an interior surface and an exterior surface; and
   a fairing positioned on the interior surface of the ram door.

2. The ram door assembly of claim 1, wherein the fairing is configured to smoothly direct air into the intake duct when the ram door is in the open position.

3. The ram door assembly of claim 1, wherein the interior surface has an inner area adjacent an aft edge and an outer area adjacent the forward edge, and wherein the fairing is positioned on the inner area of the interior surface of the ram door.

4. The ram door assembly of claim 1, wherein the forward section extends generally at a first angle from the ram door and the aft section extends generally at a second angle to the ram door, the second angle being greater than the first angle.

5. The ram door assembly of claim 1, wherein the forward section is generally concave.

6. The ram door assembly of claim 1, wherein the fairing is generally asymmetrical about a longitudinal axis.

7. The ram door assembly of claim 1, wherein the fairing is configured to reduce drag on the ram door.

8. The ram door assembly of claim 1, further comprising first, second, and third side plates extending from the interior surface of the ram door, the fairing comprising a first portion arranged between the first and second side plates and a second portion arranged between the second and third side plates.

9. An assembly for an aircraft, comprising:
   an auxiliary power unit;
   an intake duct configured to deliver an airflow to the auxiliary power unit, the intake duct having a first end coupled to the auxiliary power unit and a second end defining an intake opening;
   a ram door assembly comprising a ram door hingeably mounted adjacent to the intake opening and moveable between an open position and a closed position, the ram door having an interior surface and an exterior surface; and
   a fairing positioned on the interior surface of the ram door, wherein the fairing has a forward section that extends up from the ram door, a generally arcuate transition section, and an aft section that extends down to the ram door, and wherein the forward section extends generally at a first angle from the ram door and the aft section extends generally at a second angle to the ram door, the second angle being greater than the first angle.

10. The assembly of claim 9, wherein the fairing is configured to smoothly direct air into the intake duct when the ram door is in the open position.

11. The assembly of claim 9, wherein the interior surface has an inner area adjacent an aft edge and an outer area adjacent the forward edge, and wherein the fairing is positioned on the inner area of the interior surface of the ram door.

12. The assembly of claim 9, wherein the forward section is more tapered than the aft section.

13. The assembly of claim 9, wherein the forward section is generally concave.

14. The ram door assembly of claim 9, wherein the fairing is generally asymmetrical about a longitudinal axis.

15. The assembly of claim 9, further comprising first, second, and third side plates extending from the interior surface of the ram door, the fairing comprising a first portion extending between the first and second side plates and a second portion extending between the second and third side plates.

16. A ram door assembly for an intake opening of an intake duct of an auxiliary power unit of an aircraft; comprising:
   a ram door hingeably mounted adjacent to the intake opening of the auxiliary power unit and moveable between an open position and a closed position, the ram door having an interior surface and an exterior surface; and
   a fairing positioned on the interior surface of the ram door, further comprising first, second, and third side plates extending from the interior surface of the ram door, the fairing comprising a first fairing portion arranged between the first and second side plates and a second fairing portion arranged between the second and third side plates.

* * * * *